UNITED STATES PATENT OFFICE.

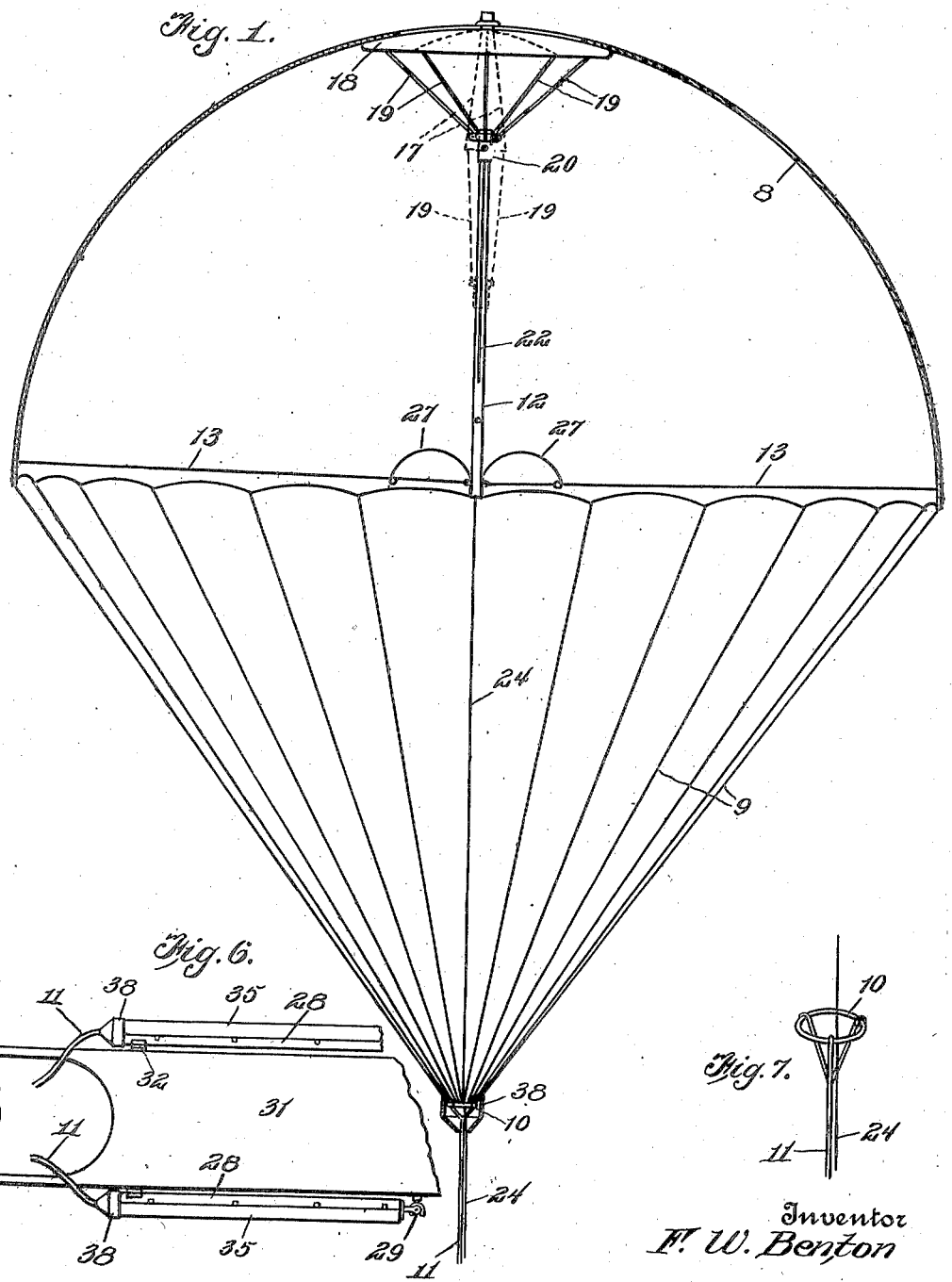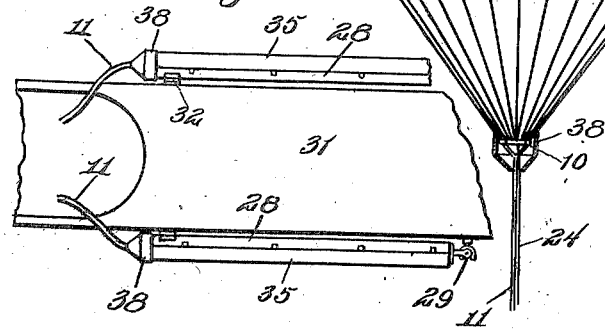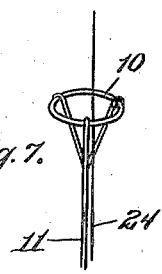

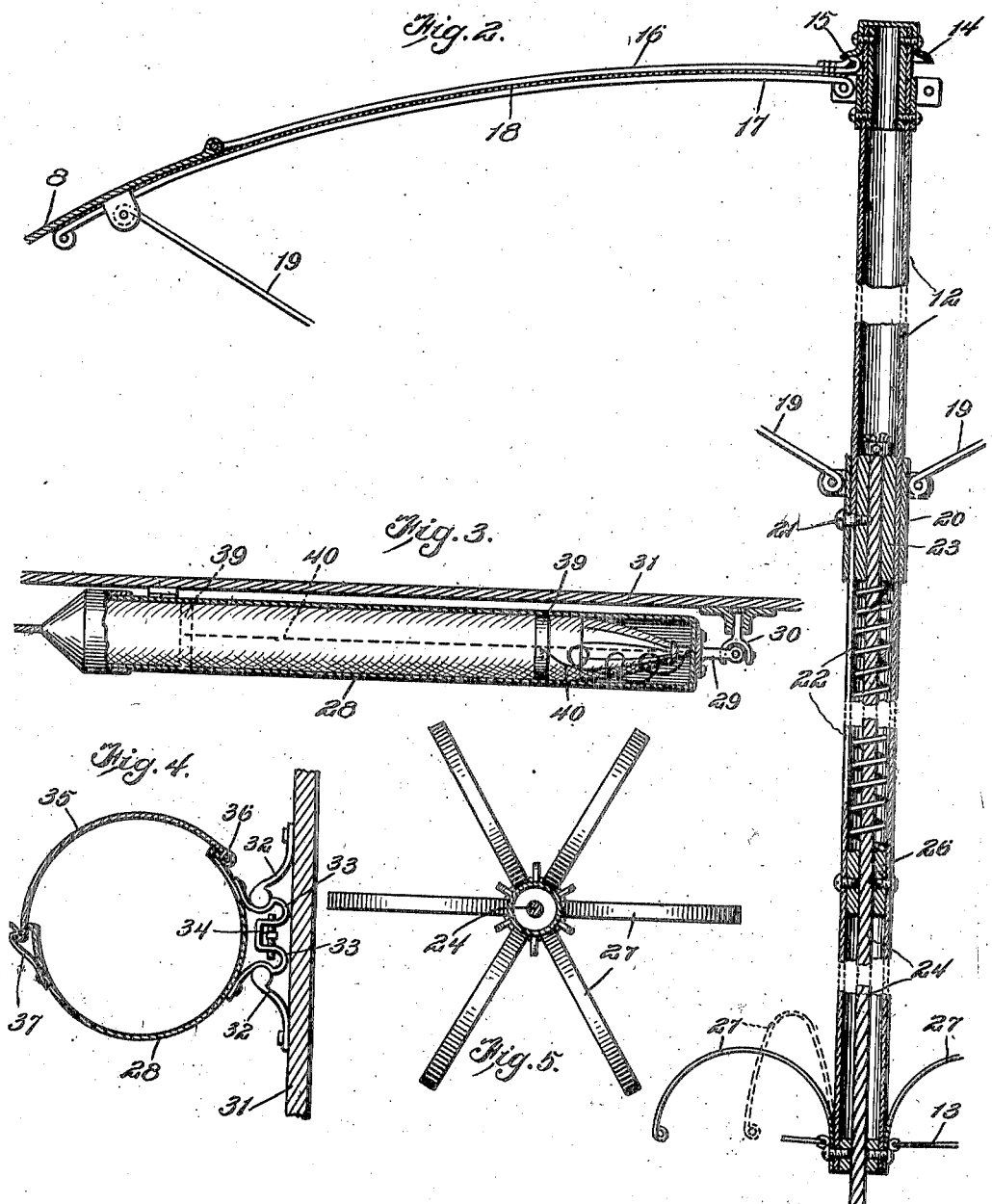

FRANK W. BENTON, OF WILSON, NORTH CAROLINA.

PARACHUTE.

1,308,033.             Specification of Letters Patent.      Patented July 1, 1919.

Application filed January 6, 1919. Serial No. 269,779.

*To all whom it may concern:*

Be it known that I, FRANK W. BENTON, a citizen of the United States, residing at Wilson, in the county of Wilson and State of North Carolina, have invented new and useful Improvements in Parachutes, of which the following is a specification.

This invention relates to aircraft apparatus, and particularly to parachutes.

The primary object of the invention is to provide a parachute of such construction as to insure proper opening of the same when launched, and which is equipped with means of an improved nature whereby the person supported by the parachute may gradually govern the speed of descent.

A further object of the invention is to provide a parachute of such construction as to be capable of being easily and neatly packed in small space, and which may be readily withdrawn and automatically opened as soon as weight is subjected thereto.

A further object of the invention is to provide a parachute adapted particularly for use upon aircraft such as airplanes, balloons, etc., which is supported upon the aircraft in such manner as to be easily and quickly accessible when it is desired to use the same, which is housed upon the aircraft body in such way as to obviate the possibility of the same becoming engaged or entangled in any of the structure of the aircraft, and which may be readily launched irrespective of the position or angle assumed by the aircraft when in flight.

With these objects in view, together with others which will appear as the description proceeds, the invention resides in the novel construction, combination and arrangement of parts, all as will be described more fully hereinafter, illustrated in the drawings, and particularly pointed out in the claims.

In the drawings:—

Figure 1 is sectional view taken through a parachute constructed in accordance with the invention, the view illustrating the parachute as it will appear when in use.

Fig. 2 is an enlarged fragmentary sectional view taken through the parachute and the central staff thereof, and illustrating the mechanism whereby the speed controlled apparatus is operated.

Fig. 3 is a sectional view taken longitudinally through the supporting casing for the parachute and showing the latter inclosed therein, Fig. 4 is an enlarged transverse sectional view taken through the parachute housing and showing the means whereby the housing is secured at one end to the aircraft body, Fig. 5 is a sectional view taken through the central staff of the parachute and showing the means for initially spreading the parachute cover, Fig. 6 is a detail diagrammatic view illustrating the manner in which the parachute housings are applied to the body of the conventional airplane, and Fig. 7 is a detail perspective view illustrating the means for connecting the parachute guy ropes and the supporting cable for the aeronaut.

Referring now to the drawings 8 indicates the body portion of the parachute, the same being formed of cloth possessing sufficient strength to withstand the strains to which it will be subjected, and this cloth has depending from its edges the guy ropes 9 all connected at their lower ends to a ring member 10. This ring member has depending therefrom a cable or rope 11 which is to support the body of the aeronaut.

The parachute is provided with a central hollow staff indicated at 12, and the upper end of this staff projects into an opening of relatively large diameter in the extreme top of the parachute. The lower end of the staff is connected by means of the ropes, cords or wires 13 with the outer portions of the body portion 8 of the parachute, whereby the said staff is at all times held properly centered within the parachute. The staff 12 is provided at its upper extremity with a cap 14 confining a ring 15, to which the inner ends of the radial reinforcing elements 16 are secured. It will be understood that these reinforcing elements may be made of relatively heavy wires or ropes, and are connected at their outer ends to the edge of the covering 8 defining the central opening in the parachute body. The upper end of the staff 12 has pivoted thereto a number of ribs 17, the latter radiating from the staff and being disposed beneath the reinforcing elements 16 and upon the interior of the parachute body. The ribs 17 are covered with a fabric 18, the latter normally closing the opening in the parachute body. The outer ends of the ribs 17 have pivotally secured thereto the outer extremities of adjusting rods 19, the inner ends of which are pivoted upon a sliding sleeve 20 upon the staff 12. This sleeve has extending therethrough a screw member 21 constituting a guide, and this screw member passes through a slot 22 extending longitudinally of the staff 12. The screw 21 also threads into a head 23 snugly fitting within the staff 12, and a rope 24 is connected to the head 23 and passes downwardly and out below the lower end of the staff 12. An expansion spring 25 is arranged within the staff 12 and is interposed between a fixed support 26 near the lower end of the staff and the slidable head 23; the spring tending normally to maintain the head and the sleeve 20 at the limit of their upward movement.

The rope 24 extends far enough below the lower end of the staff 12 to be within convenient reach of the aeronaut of the parachute, and the occupant by operating this rope may control the size of the opening in the top of the parachute. It will be understood that when the parachute is in operation and the operator pulls downwardly upon the rope 24 so as to open full wide the valve consisting of the fabric 18, the descent of the parachute will be rapid, as the air collected beneath the canvas parachute top will be allowed to rapidly escape therefrom through the central opening therein. By permitting the air to thus escape, the movement of the parachute downwardly will be steady, and danger of the parachute becoming inverted is overcome. Should the operator desire to descend more slowly, he may loosen the downward pull upon the operating rope 24, whereupon the spring 25 will force the head 23 and sleeve 20 upwardly, whereby the valve 18 will be moved to restrict the central opening in the parachute body. The downward progress of the parachute is thus retarded, and it will be understood that the speed of downward travel may be accurately controlled by manipulation of the controlling rope 24.

It will be understood that parachutes are carried upon aircraft in folded position, so as to occupy but a small amount of space, and it is imperative that some means be provided for assuring the parachutes of properly unfolding and spreading when they are launched. To accomplish this purpose, the lower end of staff 12 is provided with a plurality of leaf springs 27, the latter radiating from the staff as shown. When the parachute is folded in a manner somewhat similar to the folding of an umbrella, the body or top part of the parachute near its lower edges is engaged by the radiating leaf springs 27, and inward pressure upon these portions of the parachute body causes the leaf springs to bend in the manner indicated by dotted lines in Fig. 2 of the drawings. When, however, the parachute is released from its housing and the pressure upon the parachute body is released, the springs 27 assume a normal position, or that indicated by full lines in Fig. 2, whereupon the lower edges of the parachute top will be forced outwardly away from the central staff 12 of the parachute. This extension of the sides of the parachute body permits of air collecting within the body, and this air pressure at once operates to properly extend the parachute body.

In practice, the parachute is housed within a casing carried by the aircraft. The casing in the present instance comprises a cylindrical member or housing 28 of sufficient size to accommodate the parachute when the latter is properly folded or collapsed. This casing is provided at one end with a stem 29 having a swivel connection with the yoke 30 supported upon the side 31 of the aircraft body. The yoke may be swiveled in its bearing or support as shown. The opposite end of the housing is detachably secured to the side of the aircraft body, and the casing is preferably supported upon the body of the airship and longitudinally thereof with the free end disposed near the seat of the occupants of the airship. The free end of the casing is detachably secured to the body of the aircraft by the spring arms 32. These arms are spaced apart as shown particularly in Fig. 4, and receive between them the spring yoke 33. This yoke is attached to the casing 28, and snaps between the spring arms 32. The tension of the spring yoke 33 upon the arms 32 may be varied by adjusting the turnbuckle or similar expanding device 34.

To facilitate the ready application of the folded parachute to the casing 28, the latter is divided longitudinally, and the upper half of the casing constitutes a cover 35 hinged to the casing as at 36. The free end of this cover may be held in closed position by the spring catch 37. A cap 38 closes the free end of the casing and assists in holding the cover 35 securely in position, and this cap is secured to the occupant supporting cable of the parachute and incloses the ring 10 and the converging ends of the guy wires or cords 9.

The parachute in folded condition is encompassed by a ring or band 39, the latter being of a diameter substanially equal to the interior diameter of the cylindrical casing 28. This ring has secured thereto one end of a cord 40, the latter being secured at its opposite end to the casing near the pivoted end thereof.

When it is desired to launch the parachute from the airship in flight, the occupant of the airship will grasp the end of the supporting cable or rope 11, the latter being positioned in the body of the aircraft within convenient reach of its occupants. This rope may be equipped with the usual body sling to be applied to the body of the aeronaut prior to the launching operation of the parachute. The aeronaut may then detach the free end of the casing 28 from the spring arms 32, or he may jump from the aircraft and allow his weight to detach the free end of the casing from its support. The casing at once swings downwardly and assumes a position perpendicular to the ground. This position will be assumed regardless of the angularity of the aircraft body, by reason of the swiveled connection of the casing 28 with the yoke 30. Immediately upon pressure being applied in a downward direction, the cap 38 will become disengaged from the free end of the housing 28, and the parachute will be withdrawn therefrom. The ring 39 encompassing the folded parachute will travel with the latter, and it will be understood that this ring is positioned around the parachute in such position as to engage around the ribs 17 and that the spring arms 27 are normally held compressed or under tension by the walls of the casing at the mouth thereof. This ring travels outwardly with the parachute until limited against further movement by the cord 40, and the parachute is then free from the casing. The ribs 17 will then spread outwardly away from the central staff, thus securing a rapid opening of the parachute body to fill with air as the parachute travels downwardly. The air compressing within the restricted space at once causes the body to expand and assume normal position, as indicated in Fig. 1. The cords or wires 13 maintain the central staff 12 in proper position at all times, so that derangement of the said staff and its associated mechanism is impossible. The operator may control the speed of descent by manipulation of the controlling rope 24, as before described.

From the foregoing it is obvious that I have provided a parachute of extremely simple construction and which will readily operate in the proper manner when weight is subjected to the supporting cable. The valve mechanism is of such construction as to permit of minute adjustment, and this adjustment is readily effected by manipulation of the controlling rope. The particular construction of the parachute and the supporting housing is such as to enable the parachute to be conveniently carried upon the body of the aircraft and in such manner as to minimize the liability of breakage or derangement of any of the parts thereof.

While the above is a description of the preferred embodiment of the invention, it is to be understood that variations in the minor details of construction and arrangement of parts may be resorted to without departing from the spirit of the invention as defined by the claims.

I claim:—

1. A parachute including the usual body having an opening therein, a supporting staff in said parachute, a valve including a flexible member covering said opening, a slidable member in said staff, a connection between said slidable member and said valve, means normally holding said slidable member at the limit of its movement in one direction, and a cord for moving said slidable member against the tension of said means.

2. A parachute including the usual body having an opening therein, a supporting staff extending into said opening, arms radiating from said staff and extending across said opening, a flexible member carried by said arms and normally covering said opening, a slidable member on said staff, a connection between said slidable member and said arms, and means for moving said slidable member.

3. A parachute including the usual body having an opening therein, a supporting staff projecting into said opening, arms hinged to said staff and extending radially across said opening, a flexible member carried by said arms and normally covering said opening, a slidable member upon said staff, ropes connecting said arms and said slidable member, a spring normally holding said slidable member in one position, and a cord for moving said slidable member against the tension of said spring.

4. A parachute including the usual body having an opening therein, a supporting staff, ropes connected to said body and extending across the opening therein and connected to said staff, a cap on said staff holding said ropes in position, arms hinged to said staff and extending across said opening, a slidable member on said staff, ropes connecting the free ends of said arms and said slidable member, a spring for holding said slidable member in one position, and a cord for moving said slidable member against the pressure of said spring.

5. A parachute including the usual body having an opening therein, a staff in said parachute, a valve for controlling said opening, a sleeve on said staff, arms connecting said sleeve with said valve, a head within said staff, the said staff having an elongated opening, a screw member passing through said sleeve slot and into said head, a spring within said staff normally maintaining said head at the limit of its movement in one direction, and a cord secured to said head and passing downwardly beyond the lower end of said staff.

6. The combination with an airship, of a hollow casing hingedly connected at one end to said airship, spring arms on said airship near the opposite end of said casing, a yoke member carried by said casing and releasably engaged between said spring arms, means for varying the frictional contact of said yoke with said spring arms, and a parachute within said casing.

7. The combination with an airship, of a hollow casing pivotally connected at one end to said airship, spring arms arranged in spaced relation upon said airship, a yoke member carried by said casing and adapted to frictionally engage between said spring arms, and a turnbuckle on said yoke member whereby the latter may be caused to expand or contract.

8. The combination with an airship, of a hollow casing hingedly connected at one end to said airship, the said casing being divided longitudinally and one of the edges thereof constituting a hinged cover, a snap member holding said cover in position, and means detachably holding the free end of said casing to said airship.

9. A holding device for parachutes comprising a hollow casing, a swiveled member at one end of said casing to enable the latter to be pivotally connected to a supporting body, a parachute to be inserted within the casing, and a ring slidably arranged within the casing to inclose the parachute and limited in its movement within said casing.

In testimony whereof I affix my signature.

FRANK W. BENTON.